US010473043B2

(12) United States Patent
Sugiyama

(10) Patent No.: US 10,473,043 B2
(45) Date of Patent: Nov. 12, 2019

(54) CONTROL SYSTEM FOR AN INTERNAL COMBUSTION ENGINE

(71) Applicant: TOYOTA JIDOSHA KABUSHIKI KAISHA, Toyota-shi, Aichi-ken (JP)

(72) Inventor: Satoshi Sugiyama, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 311 days.

(21) Appl. No.: 15/445,012

(22) Filed: Feb. 28, 2017

(65) Prior Publication Data

US 2017/0254276 A1  Sep. 7, 2017

(30) Foreign Application Priority Data

Mar. 2, 2016  (JP) .................................. 2016-040280

(51) Int. Cl.
| | |
|---|---|
| *F02D 41/00* | (2006.01) |
| *F02M 26/04* | (2016.01) |
| *F02B 37/18* | (2006.01) |
| *F02B 37/22* | (2006.01) |
| *F02B 39/06* | (2006.01) |
| *F02D 37/02* | (2006.01) |
| *F02D 41/30* | (2006.01) |
| *F02M 35/10* | (2006.01) |

(52) U.S. Cl.
CPC ........ *F02D 41/0007* (2013.01); *F02B 37/183* (2013.01); *F02B 37/225* (2013.01); *F02B 39/06* (2013.01); *F02D 37/02* (2013.01); *F02D 41/3005* (2013.01); *F02M 26/04* (2016.02); *F02M 35/1038* (2013.01); *F02M 35/10157* (2013.01); *F02M 35/10222* (2013.01); *F02M 35/10255* (2013.01); *F02D 2200/0414* (2013.01); *Y02T 10/144* (2013.01)

(58) Field of Classification Search
CPC ..... F02D 41/0007; F02M 26/04; F02M 26/05
See application file for complete search history.

(56) References Cited

FOREIGN PATENT DOCUMENTS

| | | |
|---|---|---|
| JP | 2015-078637 A | 4/2015 |
| JP | 2015-129457 A | 7/2015 |

*Primary Examiner* — Ngoc T Nguyen
(74) *Attorney, Agent, or Firm* — Hunton Andrews Kurth LLP

(57) ABSTRACT

In cases where an EGR device is provided in which an EGR gas is recirculated to an upstream side of a compressor, the generation of condensed water is suppressed in an intake passage at the downstream side of the compressor. In the case where the temperature of a wall surface of the intake passage estimated or detected by a temperature detector is equal to or less than a predetermined temperature, a rotational speed of a turbine is made higher than in the case where the estimated or detected temperature of the wall surface of the intake passage is higher than the predetermined temperature, and torque of an internal combustion engine is adjusted such that an amount of change in an output of the internal combustion engine at the time of the rotational speed of the turbine being thus made higher falls within a predetermined range.

8 Claims, 11 Drawing Sheets

[Fig. 1]
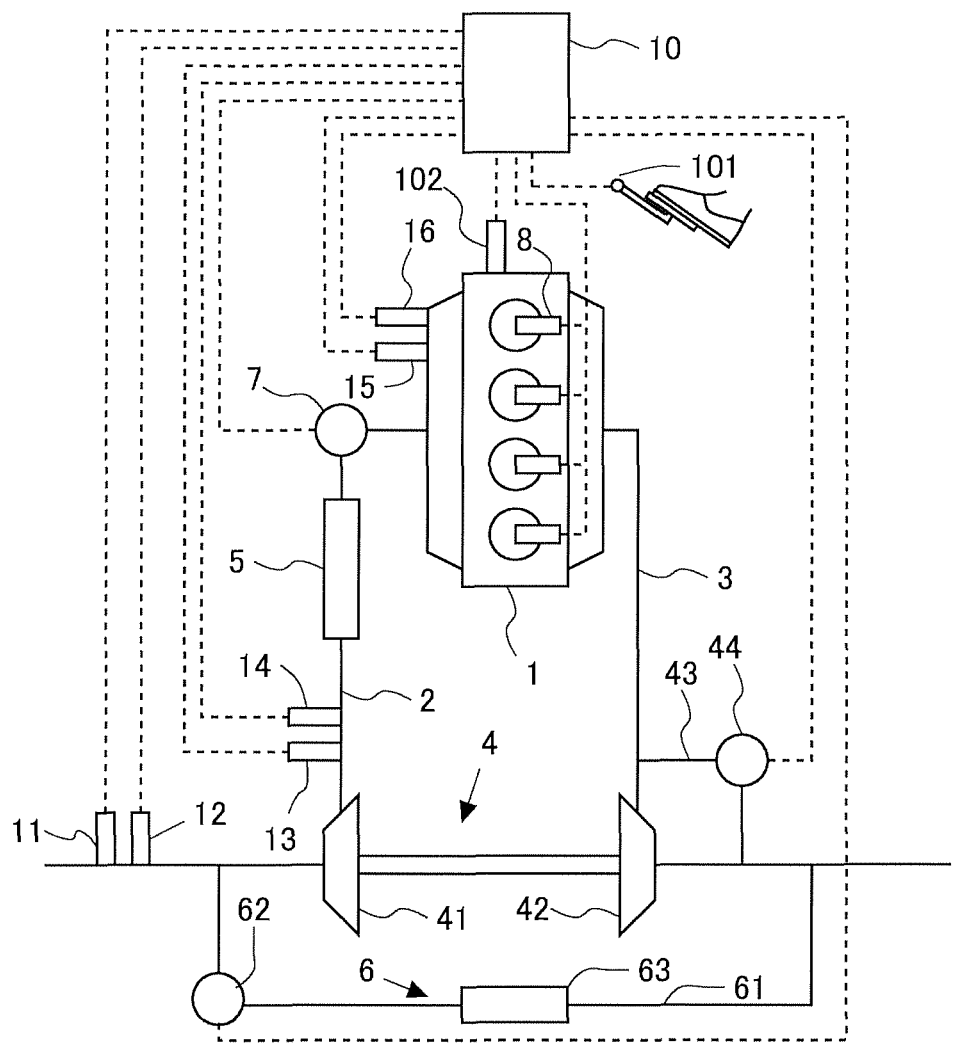

[Fig. 2]
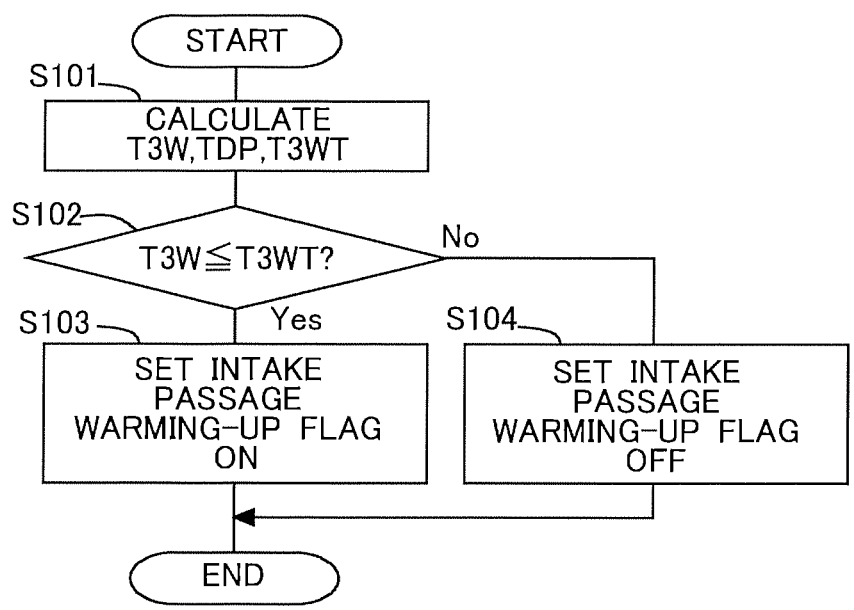

[Fig. 3]
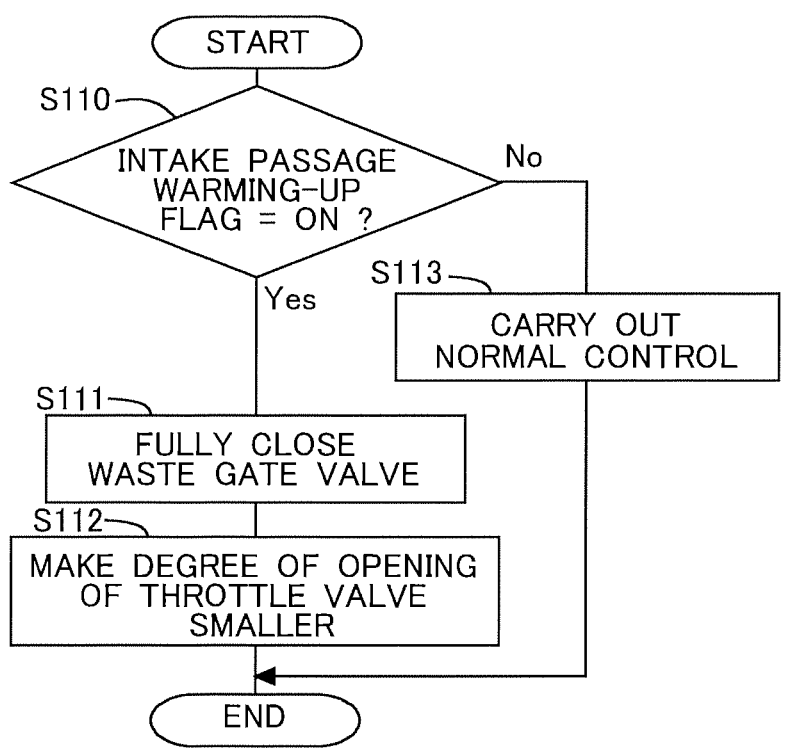

[Fig. 4]
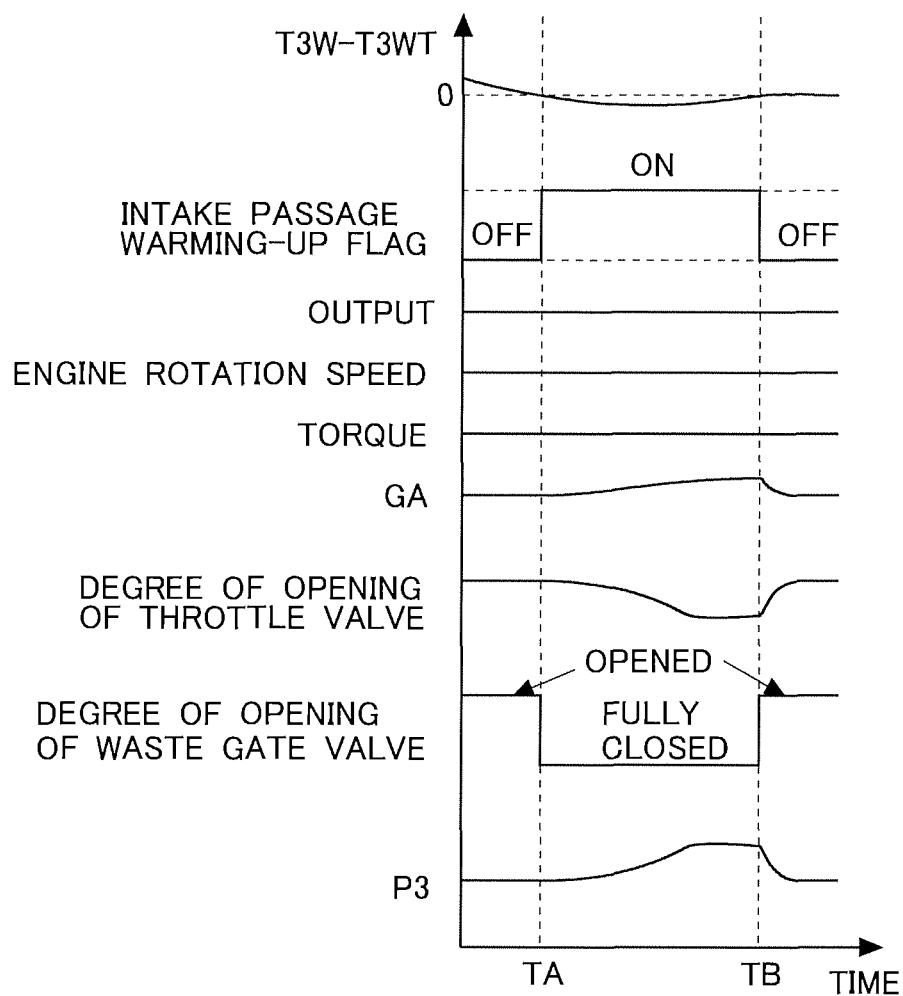

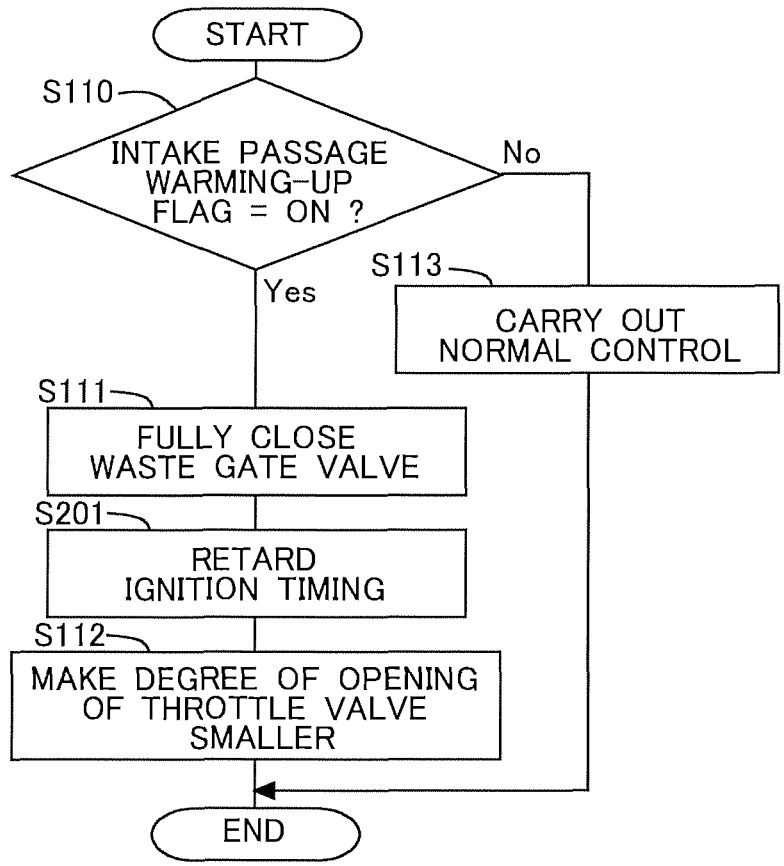

[Fig. 6]
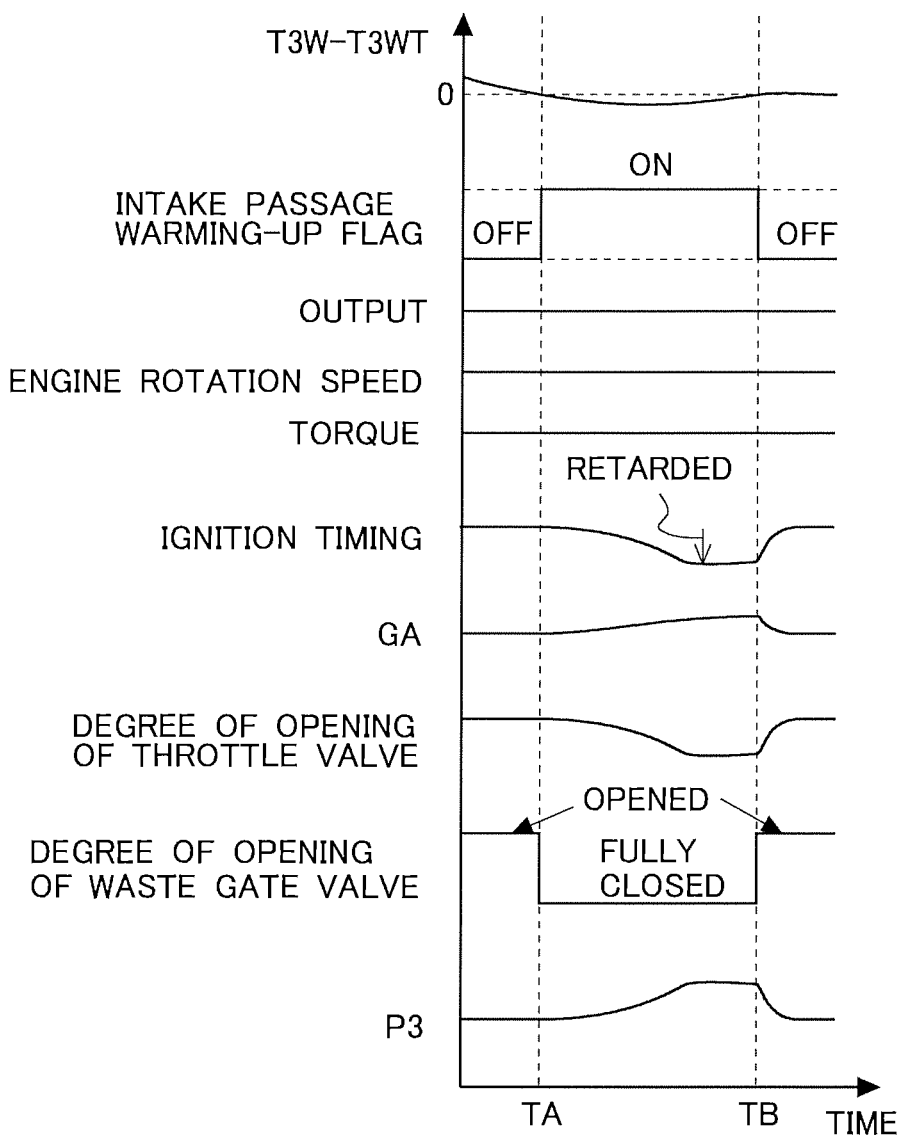

[Fig. 7]
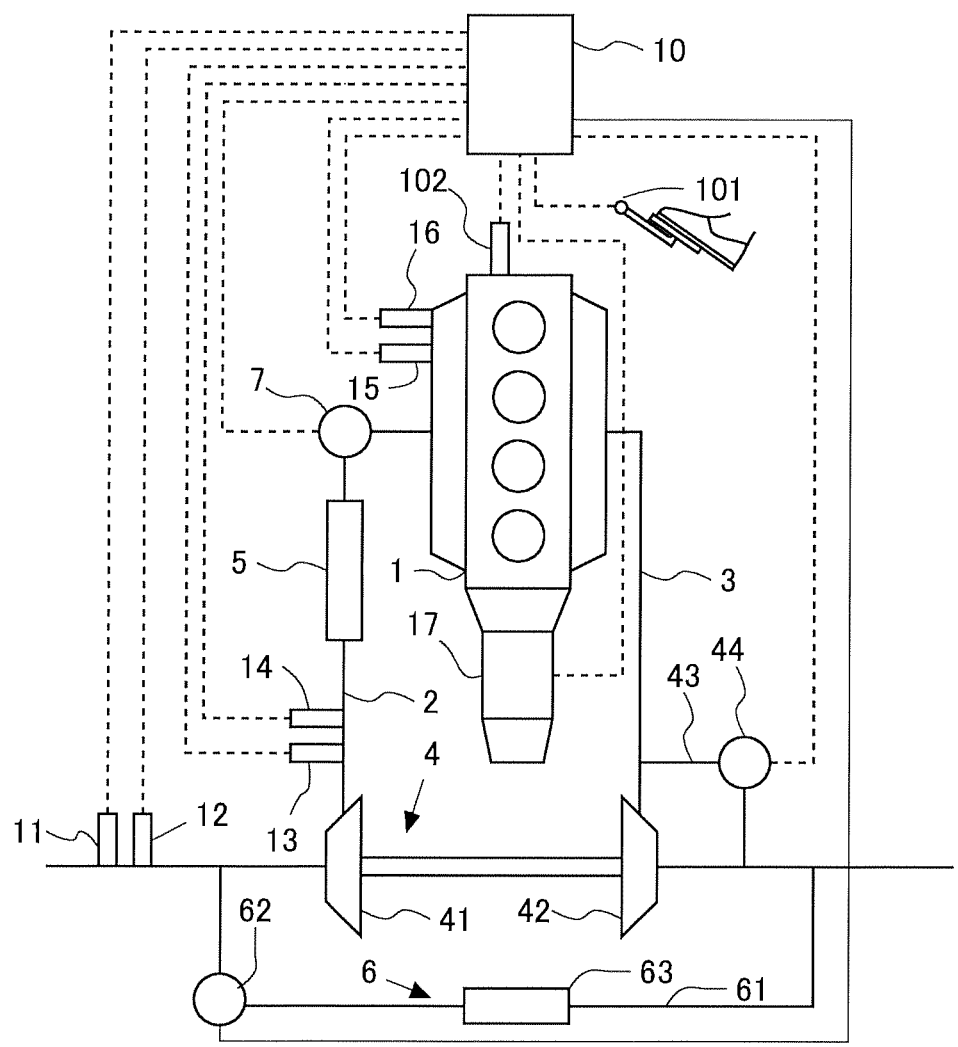

[Fig. 8]
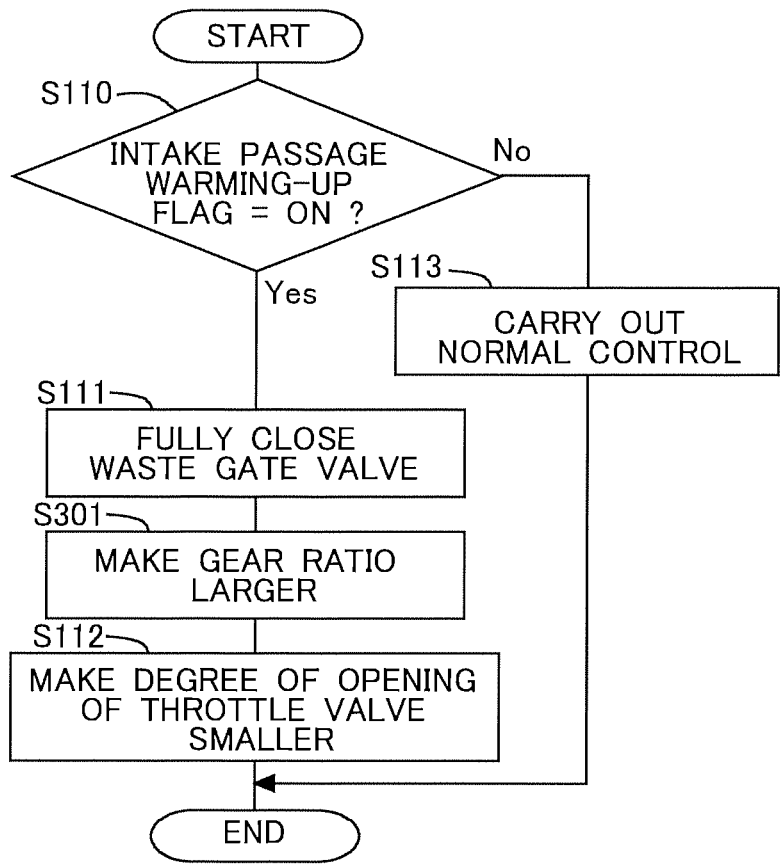

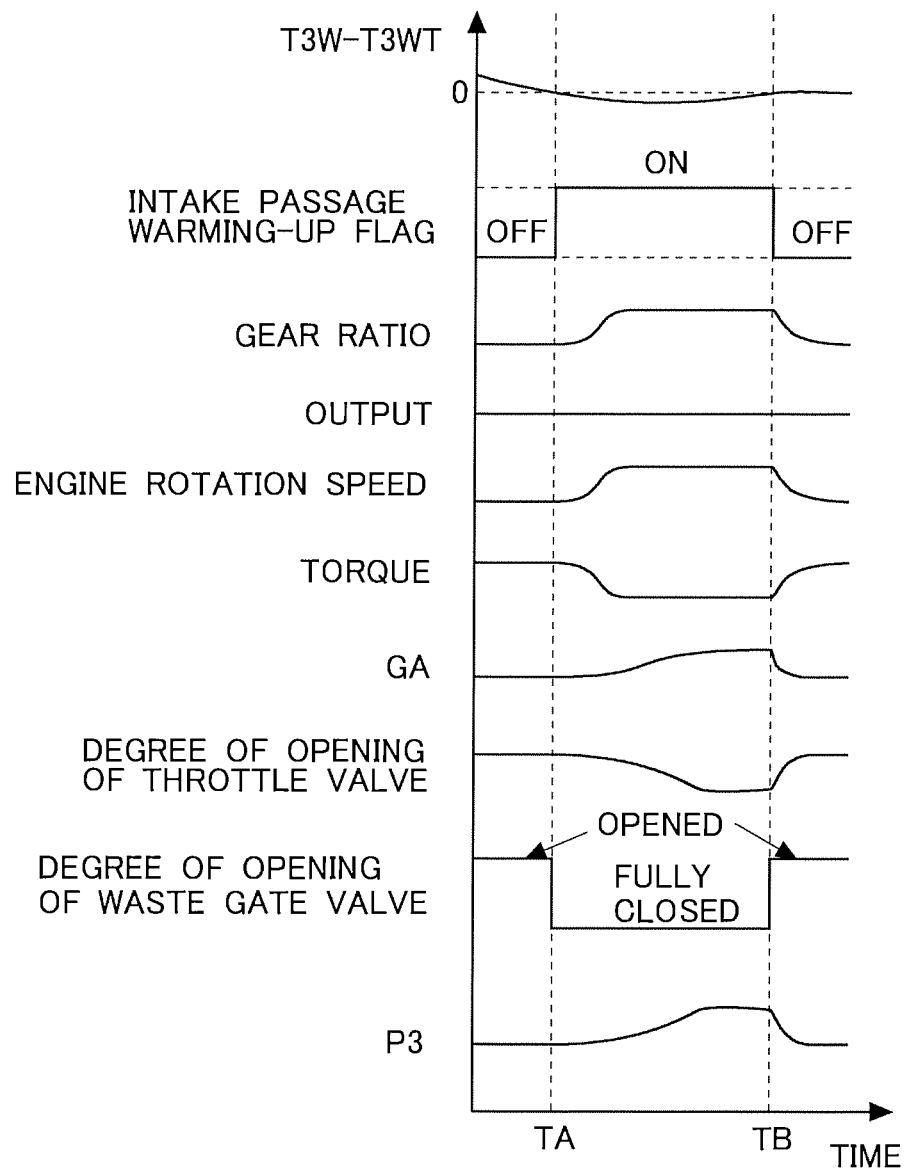
[Fig. 9]

[Fig. 10]
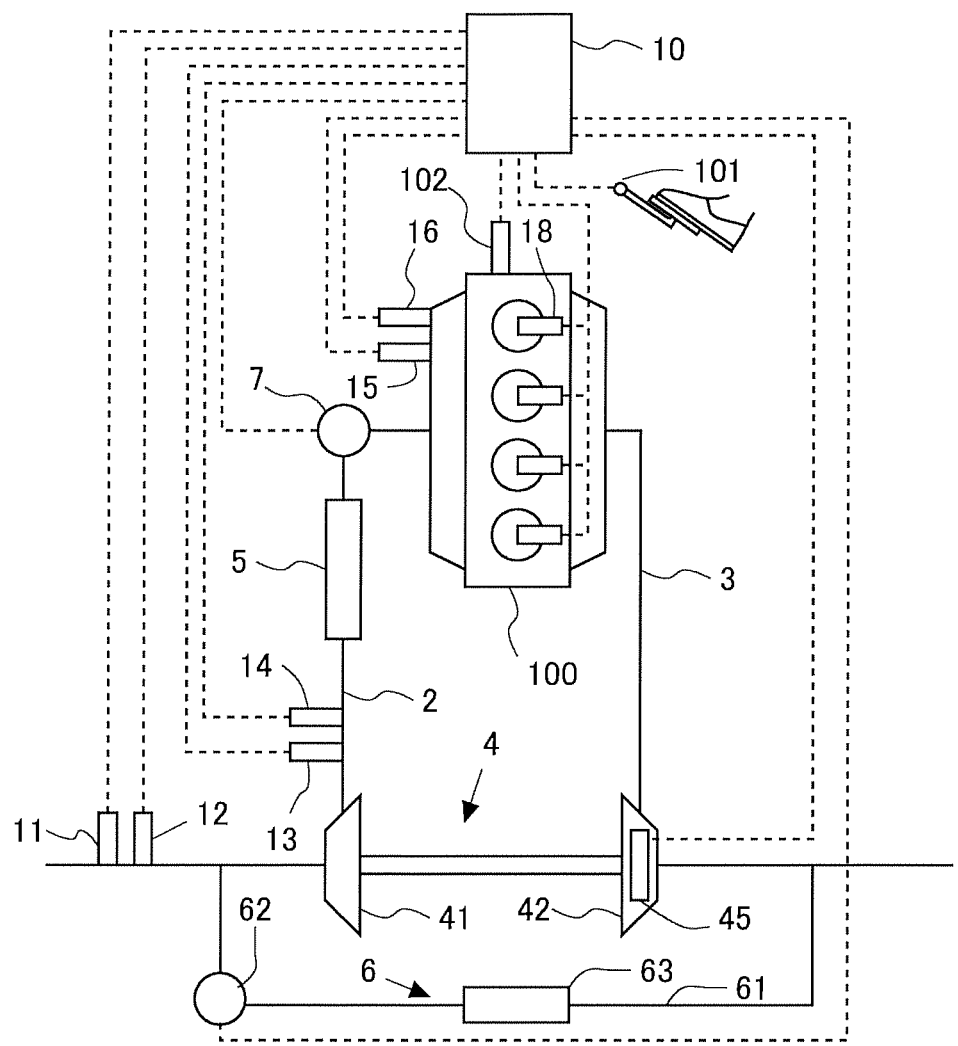

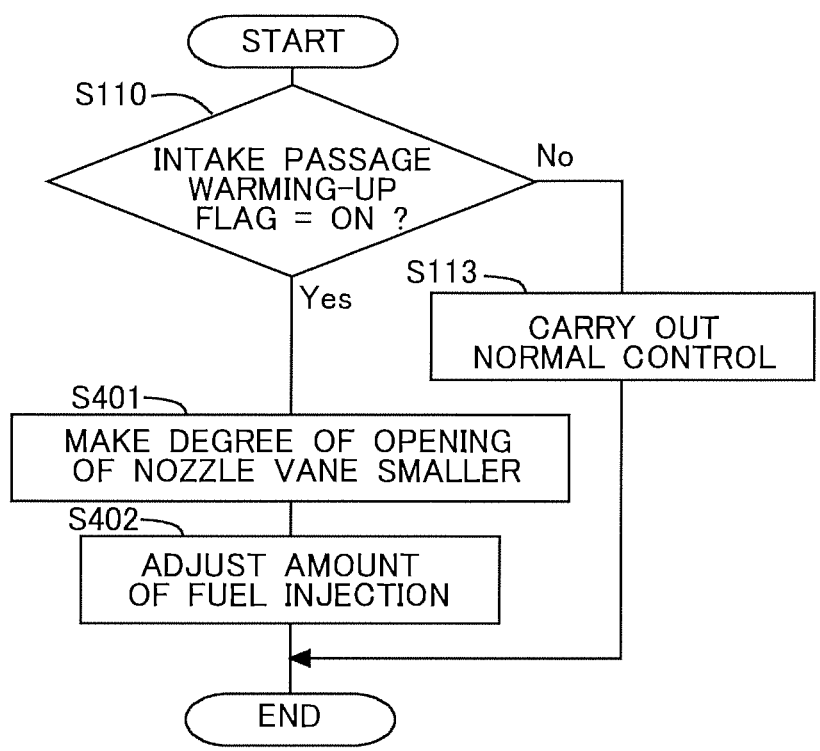
[Fig. 11]

CONTROL SYSTEM FOR AN INTERNAL COMBUSTION ENGINE

CROSS REFERENCE TO RELATED APPLICATIONS

This application claims priority to Japanese Patent Application No. 2016-040280 filed on Mar. 2, 2016, the entire contents of which are incorporated by reference herein.

TECHNICAL FIELD

The present disclosure relates to a control system for an internal combustion engine.

BACKGROUND

There is known a technology in which provision is made for a low pressure EGR device that supplies an EGR gas from an EGR passage which connects between an exhaust passage at the downstream side of a turbine of a turbocharger and an intake passage at the upstream side of a compressor of the turbocharger. In such an EGR device, the EGR gas containing a large amount of water vapor passes through the compressor. Then, in cases where the temperature of a wall surface of the intake passage at the downstream side of the compressor is equal to or less than a dew point temperature, the water vapor condenses on the wall surface of the intake passage, thereby generating condensed water. Thus, when the condensed water is generated in this manner, there is a fear that component parts of an intake system may be thereby corroded.

On the other hand, it is also known that provision is made for a bypass passage connecting between an upstream side and a downstream side of a compressor, and a bypass valve for opening and closing the bypass passage, wherein in cases where intake air is at a temperature at which condensed water tends to be generated, the temperature of the intake air is caused to rise by opening the bypass valve thereby to circulate the intake air from the downstream side to the upstream side of the compressor (for example, refer to patent literature 1).

CITATION LIST

Patent Literature

Patent Literature 1: Japanese patent laid-open publication No. 2015-129457

Patent Literature 2: Japanese patent application laid-open No. 2015-078637

SUMMARY

Technical Problem

However, even if the bypass valve is opened to raise the temperature of intake air, a part of the intake air circulates through the bypass passage, so that the amount of intake air flowing downstream of the bypass passage decreases, as a result of which the temperature of intake air at the downstream side of the bypass passage does not go up easily. In addition, because only a part of intake air recirculates through the bypass passage and is caused to rise in temperature, the rise in temperature of the entire intake air flowing into the compressor becomes slow. Accordingly, there is a fear that the temperature rise of the intake air may become insufficient to suppress the generation of condensed water.

The present disclosure has been made in view of the problems as mentioned above, and the object of the disclosure is to suppress the generation of condensed water in an intake passage at the downstream side of a compressor, in cases where provision is made for an EGR device in which an EGR gas is recirculated to the upstream side of the compressor.

Solution to Problem

In order to solve the above-mentioned problem, there is provided a control system for an internal combustion engine, which controls the internal combustion engine including a turbocharger including a compressor in an intake passage of the internal combustion engine and a turbine in an exhaust passage of the internal combustion engine, and an EGR passage connecting between said intake passage at the upstream side of said compressor and said exhaust passage at the downstream side of said turbine, said control system comprising: a temperature detector configured to estimate or detect a temperature of a wall surface of said intake passage at the downstream side of said compressor; and a controller programmed to make a rotational speed of said turbine higher in the case where the temperature of the wall surface of said intake passage estimated or detected by said temperature detector is equal to or less than a predetermined temperature which is equal to or higher than a dew point temperature of intake air flowing through said intake passage at the downstream side of said compressor, than in the case where the estimated or detected temperature of the wall surface of said intake passage is higher than said predetermined temperature, said controller programmed to adjust torque of said internal combustion engine such that an amount of change in an output of said internal combustion engine at the time of the rotational speed of said turbine being thus made higher falls within a predetermined range.

In cases where the EGR passage is connected to the upstream side of the compressor, the EGR gas passes through the compressor. In this case, when the wall temperature of the intake passage at the downstream side of the compressor is low, there is a fear that condensed water may be generated. The predetermined temperature is the dew point temperature of the intake air flowing through the intake passage at the downstream side of the compressor, or a temperature which is higher than the dew point temperature of the intake air and at which condensed water may be generated on the wall surface of the intake passage at the time when a some condition change occurs from the conditions of the intake air and the intake passage at that time. This temperature at which condensed water may be generated on the wall surface of the intake passage is a temperature which is the dew point temperature at that time with a certain margin. Here, by making the rotational speed of the turbine high, the rotational speed of the compressor is also made high, the pressure and temperature of the intake air to be delivered from the compressor go up. For this reason, the wall temperature of the intake passage at the downstream side of the compressor can be made high, so that it becomes difficult for condensed water to be generated. Accordingly, it is possible to suppress the generation of condensed water as much as possible. On the other hand, due to the rise in the pressure of the intake air, there is a fear that the output of the internal combustion engine may be increased more than necessary. Since the output of the internal combustion engine is related to the torque of the internal combustion engine and the engine rotation speed, the controller adjusts the torque of the internal combustion engine so that the amount of change in the output of the internal combustion engine falls within the predetermined range. This predetermined range is an allowable range of the amount of change in the engine output. Here, note that the controller may adjust the engine torque so that the output of the internal combustion engine does not change.

In addition, said internal combustion engine is provided with a throttle valve in said intake passage at the downstream side of said compressor, and said turbocharger is provided with a bypass passage configured to bypass said turbine, and a waste gate valve that is arranged in said bypass passage and configured to adjust a flow rate of exhaust gas flowing through said bypass passage. Said temperature detector configured to estimate or detect the temperature of the wall surface of said intake passage at the downstream side of said compressor and at the upstream side of said throttle valve, and said controller can decide an amount of fuel supply to said internal combustion engine according to an amount of intake air in said internal combustion engine, and make the rotational speed of said turbine higher, by making a degree of opening of said waste gate valve smaller, and adjust the torque of said internal combustion engine by making a degree of opening of said throttle valve smaller, in the case where the temperature of the wall surface of said intake passage estimated or detected by said temperature detector is equal to or less than said predetermined temperature, than in the case where it is higher than said predetermined temperature.

By making the degree of opening of the waste gate valve smaller, the amount of exhaust gas flowing through the bypass passage is decreased, and the amount of exhaust gas passing through the turbine is increased. With this, the rotational speed of the turbine can be made higher, the rotational speed of the compressor is also made higher, so that the pressure and temperature of intake air go up. As a result of this, the wall temperature of the intake passage rises, thus making it possible to suppress condensed water from being generated. However, when the pressure of the intake air supplied to the internal combustion engine goes up, the amount of intake air in the internal combustion engine increases, whereby the amount of fuel supply will also increase and the output of the internal combustion engine will go up. On the other hand, by making the degree of opening of the throttle valve smaller, it is possible to suppress the amount of intake air in the internal combustion engine from being increased, thus making it possible to suppress the amount of fuel supply from being increased. That is, the amount of increase in the amount of intake air due to the rotational speed of the compressor becoming higher can be offset by making the degree of opening of the throttle valves smaller, so that the rise in the torque of the internal combustion engine can be suppressed. Accordingly, it is possible to suppress the output of the internal combustion engine from being increased, so that the amount of change in the output of the internal combustion engine can be made to fall within the predetermined range. Here, note that when the degree of opening of the waste gate valve is made smaller to increase the pressure of intake air as it is, the pressure of exhaust gas at the upstream side of the turbine (back pressure) also increases. Thus, when the pumping loss of the internal combustion engine increases due to the increase in the back pressure, there is a fear that the torque of the internal combustion engine may be decreased accordingly. That is, when the degree of opening of the throttle valve is made smaller so as to offset the amount of increase in the amount of intake air due to the increase in the pressure of intake air, the torque of the internal combustion engine may be decreased by the amount of increase in the pumping loss. Accordingly, when the degree of opening of the waste gate valve is made smaller, the degree of opening of the throttle valve may be adjusted so that the amount of intake air is increased by the amount of the pumping loss, more than when the degree of opening of the waste gate valve is not made smaller or before it is made smaller.

Moreover, said internal combustion engine is provided with a spark plug configured to fire a mixture in a combustion chamber by producing an electric spark in the combustion chamber, wherein said controller can make the rotational speed of said turbine higher, by making the degree of opening of the waste gate valve smaller and by retarding ignition timing of said spark plug more, in the case where the temperature of the wall surface of said intake passage estimated or detected by said temperature detector is equal to or less than said predetermined temperature, than in the case where it is higher than said predetermined temperature.

In the case of the internal combustion engine of a spark ignition type, by retarding the ignition timing, a period of time in which combustion gas pushes a piston becomes shorter, an exhaust gas of a high temperature is discharged from the internal combustion engine. As a result, the temperature of the exhaust gas can be raised, so that the rotational speed of the turbine goes up easily. For this reason, the rotational speed of the compressor also increases easily and the pressure and temperature of intake air also go up easily, thus making it possible to raise the wall temperature of the intake passage more quickly. Accordingly, it is possible to suppress the generation of condensed water.

Further, said internal combustion engine is an internal combustion engine which performs compression self-ignition, and is provided with a fuel injection valve configured to inject fuel into a cylinder of said internal combustion engine, and said turbocharger is provided with a bypass passage configured to bypass said turbine, and a waste gate valve that is arranged in said bypass passage and configured to adjust a flow rate of exhaust gas flowing through said bypass passage. Said controller can adjust the torque of said internal combustion engine by adjusting an amount of fuel injected from said fuel injection valve, and further, can make the rotational speed of said turbine higher, by making a degree of opening of said waste gate valve smaller, in the case where the temperature of the wall surface of said intake passage estimated or detected by said temperature detector is equal to or less than said predetermined temperature, than in the case where it is higher than said predetermined temperature.

Here, by making the degree of opening of the waste gate valve smaller, the amount of exhaust gas passing through the turbine is increased. With this, the rotational speed of the turbine can be made higher, the rotational speed of the compressor is also made higher, so that the pressure and temperature of intake air go up. Accordingly, the wall temperature of the intake passage can be caused to rise, thus making it possible to suppress condensed water from being generated. On the other hand, when the degree of opening of the waste gate valve is made small, the back pressure becomes high, so that the pumping loss of the internal combustion engine increases, thus giving rise to a fear that the engine torque may decrease. In contrast to this, in the case of the internal combustion engine of the compression self-ignition type, it is possible to suppress the engine torque from decreasing, by increasing the amount of fuel injection. Thus, in the internal combustion engine which is provided with a fuel injection valve that injects fuel in a cylinder of the internal combustion engine, the torque of the internal combustion engine can be adjusted by adjusting the amount of fuel injected from the fuel injection valve, thus making it possible to suppress the output of the internal combustion engine from being changed. Accordingly, even if the pressure and temperature of intake air go up by making the degree of opening of the waste gate valve smaller, the torque of the internal combustion engine can be adjusted by adjusting the amount of fuel injected from the fuel injection valve, so that the amount of change in the output of the internal combustion engine can be made to fall within the predetermined range.

In addition, said internal combustion engine is an internal combustion engine which performs compression self-ignition, and is provided with a fuel injection valve configured to inject fuel into a cylinder of said internal combustion engine, and said turbocharger is provided with a nozzle vane configured to adjust a flow speed of exhaust gas passing through said turbine, wherein said controller can adjust the torque of said internal combustion engine by adjusting an amount of fuel injected from said fuel injection valve, and further, can make the rotational speed of said turbine higher by making a degree of opening of the nozzle vane smaller, in the case where the temperature of the wall surface of said intake passage estimated or detected by said temperature detector is equal to or less than said predetermined temperature, than in the case where it is higher than said predetermined temperature.

Here, by making the degree of opening of the nozzle vane smaller, the flow speed of exhaust gas passing through the turbine is made faster. With this, the rotational speed of the turbine can be made higher, the rotational speed of the compressor is also made higher, so that the pressure and temperature of intake air go up. Accordingly, the wall temperature of the intake passage can be caused to rise, thus making it possible to suppress condensed water from being generated. On the other hand, by making the degree of opening of the nozzle vane smaller, the back pressure becomes high, so that the pumping loss of the internal combustion engine increases, thus giving rise to a fear that the engine torque may decrease. In contrast to this, in the case of the internal combustion engine of the compression self-ignition type, it is possible to suppress the engine torque from decreasing, by increasing the amount of fuel injection. Thus, in the internal combustion engine which is provided with a fuel injection valve that injects fuel in a cylinder of the internal combustion engine, the torque of the internal combustion engine can be adjusted by adjusting the amount of fuel injected from the fuel injection valve, thus making it possible to suppress the output of the internal combustion engine from being changed. Accordingly, even if the pressure and temperature of intake air go up by making the degree of opening of the nozzle vane smaller, the torque of the internal combustion engine can be adjusted by adjusting the amount of fuel injected from the fuel injection valve, so that the amount of change in the output of the internal combustion engine can be made to fall within the predetermined range.

Moreover, said turbocharger is further provided with a bypass passage configured to bypass said turbine, and a waste gate valve that is arranged in said bypass passage and configured to adjust a flow rate of exhaust gas flowing through said bypass passage, wherein said controller can also make the rotational speed of said turbine higher by making the degree of opening of said nozzle vane smaller and by making a degree of opening of said waste gate valve smaller, in the case where the temperature of the wall surface of said intake passage estimated or detected by said temperature detector is equal to or less than said predetermined temperature, than in the case where it is higher than said predetermined temperature.

In cases where the turbocharger is provided with both a nozzle vane and a waste gate valve, the rotational speed of the turbine can be raised by making the degrees of opening of the nozzle vane and the waste gate valve smaller. Accordingly, the wall temperature of the intake passage can be caused to rise, thus making it possible to suppress condensed water from being generated.

Further, said controller can make the rotational speed of said turbine higher by retarding the fuel injection timing of said fuel injection valve more, in the case where the temperature of the wall surface of said intake passage estimated or detected by said temperature detector is equal to or less than said predetermined temperature, than in the case where it is higher than said predetermined temperature.

In the case of the internal combustion engine of the compression self-ignition type, by retarding the fuel injection timing, a period of time in which combustion gas pushes a piston becomes shorter, an exhaust gas of a high temperature is discharged from the internal combustion engine. As a result, the temperature of the exhaust gas can be raised, so that the rotational speed of the turbine goes up easily. For this reason, the rotational speed of the compressor also increases easily and the pressure and temperature of intake air also go up easily, thus making it possible to raise the wall temperature of the intake passage more quickly. Accordingly, it is possible to suppress the generation of condensed water.

In addition, provision is further made for a transmission which is connected to an output shaft of said internal combustion engine, and a gear ratio of which is controlled by said controller, wherein said controller can make the rotational speed of said turbine higher by making a gear ratio of said transmission higher, in the case where the temperature of the wall surface of said intake passage estimated or detected by said temperature detector is equal to or less than said predetermined temperature, than in the case where it is higher than said predetermined temperature.

Here, the engine rotation speed goes up by making the gear ratio of the transmission higher. Then, by making the rotational speed of the internal combustion engine go up, the flow rate of exhaust gas passing through the turbine is increased, so that the rotational speed of the turbine and the rotational speed of the compressor are also made higher, thereby raising the temperature of intake air. Accordingly, the wall temperature of the intake passage can be raised. As a result of this, it is possible to suppress the generation of condensed water. Here, note that when only the rise in the rotation speed of the internal combustion engine is carried out, the output of the internal combustion engine will increase. In contrast to this, by making the gear ratio of the transmission higher, the rotation speed of the internal combustion engine goes up, but the torque of the internal combustion engine is made to decrease at this time. For example, in a gasoline engine, by making the degree of opening of the throttle valve smaller according to the gear ratio of the transmission being made higher, the torque of the internal combustion engine can be made to decrease. In addition, for example, in a diesel engine, by making the amount of fuel injection smaller according to the gear ratio of the transmission being made higher, the torque of the internal combustion engine can be made to decrease. Thus, by adjusting the gear ratio of the transmission, and the degree of opening of the throttle valve or the amount of fuel injection thereby to adjust the rotation speed and the torque of the internal combustion engine in association with each other, the amount of change in the output of the internal combustion engine can be made to fall within the predetermined range.

Advantageous Effects

According to the present disclosure, in cases where provision is made for an EGR device in which an EGR gas is recirculated to the upstream side of a compressor, it is possible to suppress the generation of condensed water in an intake passage at the downstream side of the compressor.

BRIEF DESCRIPTION OF DRAWINGS

FIG. 1 is a view showing the schematic construction of intake and exhaust systems of an internal combustion engine according to a first embodiment of the present disclosure.

FIG. 2 is a flow chart showing a flow for setting an intake passage warming-up flag according to the first embodiment.

FIG. 3 is a flow chart showing a flow for suppressing the generation of condensed water according to the first embodiment.

FIG. 4 is a time chart showing the changes over time of a variety of kinds of values in cases where intake passage warming-up control according to the first embodiment is carried out.

FIG. 5 is a flow chart showing a flow for suppressing the generation of condensed water according to a second embodiment.

FIG. 6 is a time chart showing the changes over time of a variety of kinds of values in cases where intake passage warming-up control according to the second embodiment is carried out.

FIG. 7 is a view showing the schematic construction of intake and exhaust systems of an internal combustion engine according to a third embodiment of the present disclosure.

FIG. 8 is a flow chart showing a flow for suppressing the generation of condensed water according to the third embodiment.

FIG. 9 is a time chart showing the changes over time of a variety of kinds of values in cases where intake passage warming-up control according to the third embodiment is carried out.

FIG. 10 is a view showing the schematic construction of intake and exhaust systems of an internal combustion engine according to a fourth embodiment of the present disclosure.

FIG. 11 is a flow chart showing a flow for suppressing the generation of condensed water according to the fourth embodiment.

DESCRIPTION OF EMBODIMENTS

Hereinafter, the best modes for carrying out the present disclosure will be exemplarily described in detail based on preferred embodiments with reference to the attached drawings. However, the dimensions, materials, shapes, relative arrangements and so on of component parts described in the embodiments are not intended to limit the scope of the present disclosure to these alone in particular as long as there are no specific statements.

First Embodiment

FIG. 1 is a view showing the schematic construction of intake and exhaust systems of an internal combustion engine 1 according to a first embodiment. The internal combustion engine 1 shown in FIG. 1 is a gasoline engine mounted on a vehicle. An intake passage 2 and an exhaust passage 3 are connected to the internal combustion engine 1. In the middle of the intake passage 2, there is provided a compressor 41 of a turbocharger 4. In addition, in the intake passage 2 at a location downstream of the compressor 41, there is arranged an intercooler 5 for performing heat exchange between intake air and cooling water or ambient air.

On the other hand, in the middle of the exhaust pipe 3, there is provided a turbine 42 of the turbocharger 4. In addition, the turbocharger 4 is provided with a bypass passage 43 which bypasses the turbine 42. In the bypass passage 43, there is arranged a waste gate valve 44 that is opened and closed in order to change the channel cross section of the bypass passage 43.

In addition, the internal combustion engine 1 is provided with an EGR device 6 that serves to supply a part of exhaust gas to the intake passage 2 as an EGR gas. The EGR device 6 is constructed by comprising: an EGR passage 61 connecting between the exhaust passage 3 at the downstream side of the bypass passage 43 and the intake passage 2 at the upstream side of the compressor 41; an EGR valve 62 that is opened and closed in order to change the channel cross section of the EGR passage 61; and an EGR cooler 63 that carries out heat exchange between the EGR gas and the cooling water or the ambient air.

In the intake passage 2 at the downstream side of the intercooler 5, there is arranged a throttle valve 7 that serves to adjust the flow rate of intake air. On the intake passage 2 at the upstream side of a location where the EGR passage 61 is connected thereto, there are mounted an air flow meter 11 for detecting an amount of intake air in the internal combustion engine 1 and a humidity sensor 12 for detecting a humidity of intake air. In addition, on the intake passage 2 at the downstream side of the compressor 41 and at the upstream side of the intercooler 5, there are mounted a compressor discharge pressure sensor 13 that detects the pressure of the intake air delivered or discharged from the compressor 41, and a compressor discharge temperature sensor 14 that detects the temperature of the intake air delivered or discharged from the compressor 41. Moreover, on the intake passage 2 at the downstream side of the throttle 7, there are mounted an intake air pressure sensor 15 that detects the pressure of the intake air supplied to the internal combustion engine 1, and an intake air temperature sensor 16 that detects the temperature of the intake air supplied to the internal combustion engine 1. In the internal combustion engine 1, a spark plug 8 is mounted on each cylinder for generating an electric spark therein.

Moreover, in the internal combustion engine 1, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements. The above-mentioned sensors, an accelerator opening sensor 101, which is able to detect an engine load by outputting an electrical signal corresponding to an amount of depression of an accelerator pedal, and a crank position sensor 102, which detects the rotational speed of the internal combustion engine 1, are connected to the ECU 10 through electrical wiring, so that the output signals of these sensors are inputted to the ECU 10. On the other hand, the throttle valve 7, the spark plugs 8, the waste gate valve 44, and the EGR valve 62 are connected to the ECU 10 through electrical wiring, so that these valves and spark plugs are controlled by means of the ECU 10.

Here, when the EGR passage 61 is connected to the upstream side of the compressor 41 as in this embodiment, the EGR gas passes through the compressor 41. A lot of water vapor generated by the combustion of fuel is contained in the EGR gas. For this reason, when the wall temperature of the intake passage 2 at the downstream side of the compressor 41 is low, moisture in the EGR gas condenses on the wall surface of the intake passage 2. Thus, when condensed water is generated in this manner, there is a fear that component members provided on the intake passage 2 at the upstream side of the intercooler 5 may corrode. Accordingly, in this embodiment, in order to suppress condensed water from being generated in the intake passage 2 at the downstream side of the compressor 41 and at the upstream side of the intercooler 5, the ECU 10 controls the waste gate valve 44 so that the wall temperature of the intake passage 2 becomes higher than a predetermined temperature. Here, note that the predetermined temperature is set to a temperature which is higher than a dew point temperature of intake air but at which condensed water may be generated, or is set to the dew point temperature of intake air. The temperature which is higher than the dew point temperature of intake air but at which condensed water may be generated is a temperature which is the dew point temperature of intake air with a certain margin provided thereto.

In the case where the wall temperature of the intake passage 2 is equal to or less than the predetermined temperature, the ECU 10 makes the degree of opening of the waste gate valve 44 smaller than in the case where it is higher than the predetermined temperature. Here, note that in the case where the wall temperature of the intake passage 2 is equal to or less than the predetermined temperature, the waste gate valve 44 may be fully closed. By making the degree of opening of the waste gate valve 44 smaller, the amount of exhaust gas flowing through the bypass passage 43 is decreased, and the amount of exhaust gas passing through the turbine 42 is increased. For this reason, the rotational speed of the turbine 42 is made to rise, so that the rotational speed of the compressor 41 is also made to rise. With this, the pressure and temperature of the intake air at the downstream side of the compressor 41 go up. As a result of this, if the wall temperature of the intake passage 2 rises above the predetermined temperature, it is possible to suppress condensed water from being generated.

On the other hand, in the gasoline engine, the ECU 10 decides the amount of fuel supply according to the amount of intake air, so that the air fuel ratio of the internal combustion engine 1 is adjusted to a predetermined air fuel ratio. For this reason, when the pressure of intake air becomes higher thereby to increase the amount of fresh air to be supplied to the internal combustion engine 1, the ECU 10 will increase the amount of fuel supply thereby to adjust the air fuel ratio to the predetermined air fuel ratio, as a result of which the torque of the internal combustion engine 1 will be increased. In that case, the output of the internal combustion engine 1 will be increased, and the vehicle speed will become higher. To cope with this, the torque of the internal combustion engine 1 is adjusted so that an amount of change in the output of the internal combustion engine 1 falls within a predetermined range. The torque of the internal combustion engine 1 is adjusted by making the degree of opening of the throttle valve 7 smaller by means of the ECU 10. An amount of increase in the amount of intake air due to an increase in the pressure of intake air can be offset by making the degree of opening of the throttle valve 7 smaller, so that it is possible to suppress the amount of intake air in the internal combustion engine 1 from being increased excessively. Accordingly, it is possible to suppress the engine to from being increased. Because the output of the internal combustion engine 1 is associated with the torque of the internal combustion engine 1 and the engine rotation speed, the amount of change in the output of the internal combustion engine 1 can be made to fall within the predetermined range by adjusting the torque of the internal combustion engine 1. Here, note that the predetermined range may also be an allowable range. The predetermined range is set, for example, based on drivability. Also, note that in this embodiment, the degree of opening of the throttle valve 7 is adjusted so that the torque of the internal combustion engine 1 is not changed.

Here, the higher the humidity of the intake air discharged from the compressor 41, the easier it becomes for condensed water to be generated, or the higher the pressure of the intake air discharged from the compressor 41, the easier it becomes for condensed water to be generated, or the lower the temperature of the intake air discharged from the compressor 41, the easier it becomes for condensed water to be generated, or the higher the EGR ratio, the easier it becomes condensed water to be generated. On the other hand, the lower the air temperature, or the higher the vehicle speed, the lower becomes the wall temperature of the intake passage 2, so that condensed water is generated easily. Accordingly, in order to suppress the generation of condensed water, it is effective to change the humidity, the pressure, the temperature and the EGR ratio of the intake air discharged from the compressor 41 so as to suppress the generation of condensed water, or it is effective to raise the wall temperature of the intake passage 2. Here, in order to suppress the generation of condensed water, it can be considered to decrease the pressure of the intake air discharged from the compressor 41, or to make the EGR ratio lower. However, when such control is carried out, both of the amount of the fresh air and the amount of the EGR gas will be decreased, and in addition, the EGR ratio will be lowered, so that a desired EGR ratio is no longer obtained. For this reason, there is a fear that the output of the internal combustion engine 1 may become lower and the amount of NOx discharged from the internal combustion engine 1 may be increased. Accordingly, it is difficult to decrease the pressure of the intake air discharged from the compressor 41 as well as to suppress the generation of condensed water by making the EGR ratio low. Moreover, it is also difficult to adjust the humidity of intake air by adjusting the amount of moisture in intake air. Thus, in this embodiment, the generation of condensed water is suppressed by raising the temperature of the intake air discharged from the compressor 41, and at the same time, the generation of condensed water is suppressed by further raising the temperature of this intake air thereby to raise the wall temperature of the intake passage 2.

Hereinafter, it is considered that it is effective to change which parameter, in order to raise the temperature of the intake air discharged from the compressor 41. Here, the heat transfer between the intake air discharged from the compressor 41 and the inner wall of the intake passage 2 is represented as shown by the following expression 1.

$$Q = H \cdot A1 \cdot (T3 - T3W) \qquad \text{Expression 1}$$

Here, Q is the amount of heat transfer; H is the rate of heat transfer; A1 is the area of heat transfer; T3 is the temperature of the intake air discharged from the compressor 41 (hereinafter, also referred to as the compressor discharge temperature); and T3W is the wall temperature of the intake passage 2.

From the expression 1 above, it is necessary to increase the rate of heat transfer H or the compressor discharge temperature T3, in order to raise the wall temperature of the intake passage 2. Accordingly, first of all, it is considered the case where the compressor discharge temperature T3 in the expression 1 is made to increase.

The definition equation of the efficiency EC of the compressor 41 is shown by the following expression 2.

$$EC = \frac{T1}{T3-T1}\left\{\left(\frac{P3}{P1}\right)^{\frac{K1-1}{K1}} - 1\right\} \qquad \text{Expression 2}$$

Here, EC is the compressor efficiency; T1 is the temperature of the intake air at the inlet side of the compressor 41 (hereinafter, also referred to as the compressor inlet temperature); T3 is the compressor discharge temperature; and P1 is the intake air pressure at the inlet side of the compressor 41 (hereinafter, also referred to as the compressor inlet port pressure), P3 is the pressure of the intake air discharged from the compressor 41 (hereinafter, also referred to as the compressor discharge pressure); and K1 is the ratio of specific heat of ambient air.

By transforming the expression 2, the following expression 3 is obtained.

$$T3 = T1 + \frac{T1}{EC}\left\{\left(\frac{P3}{P1}\right)^{\frac{K1-1}{K1}} - 1\right\} \qquad \text{Expression 3}$$

In addition, the definition equation of the total efficiency ETOT of the turbocharger 4 is shown by the following expression 4.

$$ETOT = \frac{CP1 \cdot GA \cdot T1\left\{\left(\frac{P3}{P1}\right)^{\frac{K1-1}{K1}} - 1\right\}}{CP4 \cdot G4 \cdot T4\left\{1 - \left(\frac{P4}{P6}\right)^{\frac{1-K4}{K4}}\right\}} \qquad \text{Expression 4}$$

Here, ETOT is the turbocharger total efficiency; CP1 is the specific heat at constant pressure of ambient air; GA is the amount of intake air; CP4 is the specific heat at constant pressure of the exhaust gas; G4 is a totaled value of the amount of intake air and the amount of fuel injection; T4 is the temperature of the exhaust gas at the inlet side of the turbine 42 (hereinafter, referred to as the turbine inlet temperature); P4 is the pressure of the exhaust gas at the inlet side of the turbine 42 (hereinafter, referred to as the turbine inlet pressure); P6 is the pressure of the exhaust gas discharged from the turbine 42 (hereinafter, referred to as the turbine discharge pressure); and K4 is the ratio of specific heat of the exhaust gas.

The following expression 5 is obtained by modifying the expression 4 using the compressor efficiency EC, the mechanical efficiency EMT of the turbine 42, and the air fuel ratio AF.

$$\left(\frac{P3}{P1}\right)^{\frac{K1-1}{K1}} - 1 = \qquad \text{Expression 5}$$
$$EC \cdot ETM \frac{CP4 \cdot T4}{CP1 \cdot T1}\left(1 + \frac{1}{AF}\right)\left\{1 - \left(\frac{P4}{P6}\right)^{\frac{1-K4}{K4}}\right\}$$

The following expression 6 is obtained from the expression 3 and the expression 5.

$$T3 = T1 + ETM \frac{CP4 \cdot T4}{CP1}\left(1 + \frac{1}{AF}\right)\left\{1 - \left(\frac{P4}{P6}\right)^{\frac{1-K4}{K4}}\right\} \qquad \text{Expression 6}$$

On the other hand, the amount of intake air GA in the internal combustion engine 1 is shown by the following expression 7.

$$GA = RB \cdot EVB \frac{NE \cdot VL}{120} \qquad \text{Expression 7}$$

Here, RB is the density of intake air at the downstream side of the throttle valve 7; EVB is the volumetric efficiency; NE is the engine rotation speed (the number of revolutions per minute); and VL is the amount of exhaust gas. The density of intake air RB is proportional to the pressure of the intake air at the downstream side of the throttle valve 7, and is in inverse proportion to the temperature of the intake air at the downstream side of the throttle valve 7, and hence, can be obtained based on the values of these factors.

Here, from the expression 6, it can be seen that it is effective to increase P4/P6 or to increase T4, in order to raise the compressor discharge temperature T3. The ratio P4/P6 is the expansion ratio of the exhaust gas in the turbine 42, and in order to increase P4/P6, it is effective to make small the degree of opening of the waste gate valve 44. Also, in order to increase T4, it is effective to raise the temperature of the gas discharged from the internal combustion engine 1, and to this end, it is effective to retard the ignition timing. In addition, the wall temperature of the intake passage 2 can be raised more quickly by circulating intake air of high temperature in a larger amount. For this purpose, it is effective to increase the amount of intake air GA in the internal combustion engine 1. That is, according to the expression 7, it is effective to increase NE, in order to increase the amount of intake air GA.

Next, consideration is given to increasing the rate of heat transfer H in the expression 1. According to the definition of the rate of heat transfer H, the rate of heat transfer H is shown by the following expression 8.

$$H = NU \cdot RGA/DM \qquad \text{Expression 8}$$

Here, NU is a Nusselt number; RGA is the heat conductivity of air; and DM is the inside diameter of the intake passage 2.

Moreover, according to an empirical formula of turbulent heat transfer in a circular pipe, the Nusselt number NU is shown by the following expression 9.

$$NU = 0.023 \leq RE^{4/5} \cdot PR^{1/3} \qquad \text{Expression 9}$$

Here, RE is the Reynolds number and PR is the Prandtl number.

Further, the Reynolds number RE is shown by the following expression 10.

$$RE = \frac{U1 \cdot DM}{V1} = \frac{4 \cdot GA}{PI \cdot DM \cdot MU} \qquad \text{Expression 10}$$

Here, U1 is the flow speed; V1 is the coefficient of kinematic viscosity (=MU/R1); and PI is the circular constant. In addition, MU is the coefficient of viscosity; and R1 is the density.

In addition, the amount of intake air GA and the cross-sectional area AD of the intake passage 2 have the relation of the following expression 11, and also, the cross-sectional area AD of the intake passage 2 has the relation of the following expression 12.

$$GA = R1 \cdot U1 \cdot AD \qquad \text{Expression 11}$$

$$AD = PI \cdot DM^2 / 4 \qquad \text{Expression 12}$$

Accordingly, the rate of heat transfer H is proportional to RGA, $GA^{4/5}$ and $1/MU^{4/5}$. Here, as a result of the investigation of each physical property, in cases where the compressor discharge temperature T3 increases, the amount of increase of RGA and the amount of decrease of $1/MU^{4/5}$ become substantially the same with respect to each other, so that the increase of RGA and the decrease of $1/MU^{4/5}$ are also offset by each other. For this reason, in order to increase the rate of heat transfer H, it is not effective to change RGA and $1/MU^{4/5}$. Accordingly, in order to increase the rate of heat transfer H, it is found to be effective to increase GA.

As mentioned above, by making the degree of opening of the waste gate valve 44 smaller thereby to raise the rotational speed of the turbine 42, P4/P6 can be made to increase, so that the compressor discharge temperature T3 can be raised. Accordingly, the wall temperature of the intake passage 2 can also be raised. At this time, by adjusting the degree of opening of the throttle valve 7 so that the torque of the internal combustion engine 1 does not change, it is possible to suppress the output of the internal combustion engine 1 from being increased. For this reason, the ECU 10 adjusts the torque of the internal combustion engine 1 so that the amount of change in the output of the internal combustion engine 1 falls within the predetermined range. The torque of the internal combustion engine 1 is adjusted by making the degree of opening of the throttle valve 7 smaller by means of the ECU 10. The amount of increase in the amount of intake air due to the increase in the pressure of intake air can be offset by making the degree of opening of the throttle valve 7 smaller, so that it is possible to suppress the amount of intake air in the internal combustion engine 1 from being made excessively large to increase the engine output.

However, when the degree of opening of the waste gate valve 44 is made smaller to increase the pressure of intake air as it is, the pressure of exhaust gas at the upstream side of the turbine 42 (i.e., back pressure) also increases. Thus, when the pumping loss of the internal combustion engine 1 increases due to the increase in the back pressure, a decrease in the torque of the internal combustion engine 1 will be caused. That is, when the degree of opening of the throttle valve 7 is made smaller so as to offset the amount of increase in the amount of intake air due to the increase in the pressure of intake air, the torque of the internal combustion engine 1 may be decreased by the amount of increase in the pumping loss. Accordingly, in this embodiment, when the degree of opening of the waste gate valve 44 is made smaller, the degree of opening of the throttle valve 7 is adjusted so that the amount of intake air is increased by the amount of the pumping loss, more than when the degree of opening of the waste gate valve 44 is not made smaller or before it is made smaller. In this manner, by suppressing the decrease in the torque of the internal combustion engine 1 due to the increase in the pumping loss, the output of the internal combustion engine 1 is suppressed from varying. The degree of opening of the throttle valve 7 at this time becomes a degree of opening at the open side at which the amount of intake air increases by the amount of increase in the pumping loss, with respect to the degree of opening of the throttle valve 7 at which the amount of increase in the amount of intake air due to the increase in the pressure of intake air is offset. Accordingly, the fact remains that in the case where the wall temperature of the intake passage 2 is equal to or less than the predetermined temperature, the degree of opening of the throttle valve 7 becomes smaller than in the case where the wall temperature of the intake passage 2 is higher than the predetermined temperature, but it becomes larger than the degree of opening of the throttle valve 7 at which the amount of increase in the amount of intake air due to the increase in the pressure of intake air is offset. Even if the degree of opening of the throttle valve 7 is made smaller, the amount of intake air in the internal combustion engine 1 increases, when the pressure of intake air at the upstream side of the throttle valve 7 goes up. Thus, by increasing the amount of intake air, the amount of fuel supply also increases, and with this, too, the compressor discharge temperature T3 can be raised, and further, the rate of heat transfer H can also be raised. For this reason, the wall temperature of the intake passage 2 can be raised.

Here, note that the temperature of intake air can be raised by making smaller the degree of opening of the waste gate valve 44, but the temperature of intake air can be made the highest, by fully closing the waste gate valve 44 at this time. Accordingly, it is preferable to fully close the waste gate valve 44, at the time of raising the wall temperature of the intake passage 2.

FIG. 2 is a flow chart showing a flow or routine for setting an intake passage warming-up flag according to this embodiment. The routine in this flow chart is carried out by means of the ECU 10 at each predetermined time interval. The intake passage warming-up flag is a flag which is set to on when it is necessary to raise the temperature of the intake passage 2, because of a fear that condensed water may be generated, and which is set to off when it is not necessary to raise the temperature of the intake passage 2.

In step S101, a wall temperature T3W, a dew point temperature TDP, and a lower limit wall temperature T3WT are calculated. The wall temperature T3W is a wall temperature of the intake passage 2 at the downstream side of the compressor 41 and at the upstream side of the intercooler 5, and has a relation with the amount of intake air GA and the compressor discharge temperature T3. Accordingly, the relation among the wall temperature T3W, the amount of intake air GA and the compressor discharge temperature T3 has been obtained and mapped in advance by experiments, simulations, etc., or formulas for calculating such a relation have been obtained in advance, whereby the wall temperature T3W can be calculated based on the amount of intake air GA and the compressor discharge temperature T3. The amount of intake air GA is detected by the air flow meter 11, and the compressor discharge temperature T3 is detected by the compressor discharge temperature sensor 14. Here, note that in this embodiment, the ECU 10 calculates the wall temperature T3W, and thus functions as a temperature detector in the present disclosure.

In addition, the dew point temperature TDP is a dew point temperature in the intake passage 2 at the downstream side of the compressor 41 and at the upstream side of the intercooler 5, and has a relation with the humidity of ambient air RH, the EGR ratio REGR, and the compressor discharge pressure P3. Accordingly, the relation among the dew point temperature TDP, the humidity of ambient air RH, the EGR ratio REGR and the compressor discharge pressure P3 has been obtained and mapped in advance by experiments, simulations, etc., or formulas for calculating such a relation have been obtained in advance, whereby the dew point temperature TDP can be calculated based on the humidity of ambient air RH, the EGR ratio REGR, and the compressor discharge pressure P3. The humidity of ambient air RH is detected by the moisture sensor 12. The EGR ratio REGR is estimated based on the amount of intake air GA detected by the air flow meter 11, the turbine discharge pressure, the temperature in the exhaust passage 3 at the downstream side of the turbine 42 (hereinafter, also referred to as the turbine discharge temperature), the compressor inlet pressure, etc. For such an estimation, there can be used a well-known formula. Also, the turbine discharge pressure and the turbine discharge temperature may be actually measured by sensors appropriately mounted, or may be estimated by a well-known method. The compressor discharge pressure P3 is detected by the compressor discharge pressure sensor 13.

The lower limit wall temperature T3WT is a temperature which is a lower limit of the wall temperature in the intake passage 2 at the downstream side of the compressor 41 and at the upstream side of the intercooler 5 (i.e., accordingly a temperature in which the wall temperature of the intake passage 2 is controlled to be equal to or higher than this temperature), and is obtained by adding a certain amount of margin TMA to the dew point temperature TDP. An optimum value for the amount of margin TMA has been obtained in advance by experiments, simulations, or the like, by taking into consideration the balance between the deterioration of fuel economy due to the rise in the wall temperature of the intake passage 2, and the improvement in fuel economy due to the increase in the EGR gas. Here, note that in this embodiment, the lower limit wall temperature T3WT corresponds to a predetermined temperature in the present disclosure.

In step S102, it is determined whether the wall temperature T3W is equal to or less than the lower limit wall temperature T3WT. In other words, in this step S102, it is determined whether there is any fear that condensed water may be generated. In cases where an affirmative determination is made in step S102, the routine goes to step S103, where the intake passage warming-up flag is set to on. On the other hand, in cases where a negative determination is made in step S102, the routine goes to step S104. In step S104, the intake passage warming-up flag is set to off because there is no fear that condensed water may be generated.

Next, FIG. 3 is a flow chart showing a flow or routine for suppressing the generation of condensed water according to this embodiment. The routine in this flow chart is carried out by means of the ECU 10 at each predetermined time interval. The flow chart shown in FIG. 3 may be carried out in succession after the flow chart shown in FIG. 2 is terminated. Here, note that in this embodiment, the ECU 10 functions as a controller in the present disclosure, by carrying out the flow chart shown in FIG. 3.

In step S110, it is determined whether the intake passage warming-up flag is on. In other words, in this step S110, it is determined whether the intake passage warming-up control is necessary. The intake passage warming-up control is to raise the wall temperature of the intake passage 2, and is carried out during the time when the intake passage warming-up flag is on. In cases where an affirmative determination is made in step S110, the routine goes to step S111, whereas in cases where a negative determination is made, the routine goes to step S113, where normal control is carried out. The normal control referred to herein is control which is carried out when there is no fear that condensed water may be generated in the intake passage 2 at the downstream side of the compressor 41 and at the upstream side of the intercooler 5, i.e., control which is carried out in cases where the wall temperature T3W of the intake passage 2 is higher than the lower limit wall temperature T3WT, and which adjusts the waste gate valve 44, the throttle valve 7, etc., based on the operating state of the internal combustion engine 1. The normal control can also be said as control which is carried out when the intake passage warming-up control is not carried out. The relation among the operating state of the internal combustion engine 1 in the normal control, the degree of opening of the waste gate valve 44, and the degree of opening of the throttle valve 7 has been obtained in advance by experiments, simulations, or the like, and stored in the ECU 10.

On the other hand, in cases where an affirmative determination is made in step S110, the intake passage warming-up control is carried out. For this reason, in step S111, the waste gate valve 44 is fully closed as part of the intake passage warming-up control. Thereafter, the routine goes to step S112, where as part of the intake passage warming-up control, the degree of opening of the throttle valve 7 is made smaller than at the time of the normal control, so that the amount of change in the output of the internal combustion engine 1 falls within the predetermined range. At this time, the throttle valve 7 may be controlled so that the torque of the internal combustion engine 1 does not change, or in cases where a change in the rotational speed, the output or the torque of the internal combustion engine 1 is detected, the throttle valve 7 may be controlled according to an amount of the change.

FIG. 4 is a time chart showing the changes over time of a variety of kinds of values in cases where the intake passage warming-up control according to this embodiment is carried out. At a point in time indicated by TA, the wall temperature T3W becomes equal to or less than the lower limit wall temperature T3WT, so the intake passage warming-up flag is changed from off to on. With this, the waste gate valve 44 is fully closed. In that case, the rotational speed of the compressor 41 goes up, so that the compressor discharge pressure P3 increases. In order to suppress the amount of intake air GA from increasing excessively due to this increase in the compressor discharge pressure P3, the throttle valve 7 is controlled to the closed side. Here, note that the back pressure increases due to the rise in the compressor discharge pressure P3, and hence, if the amount of intake air GA is kept from changing after the intake passage warming-up flag is changed from off to on, there is a fear that the torque of the internal combustion engine 1 may decrease. For this reason, the amount of intake air GA is made to increase more than before TA, i.e., than in the case where the wall temperature T3W of the intake passage 2 is higher than the lower limit wall temperature T3WT, so that the torque does not decrease in a period of time from TA to TB. By increasing this amount of intake air GA, the amount of fuel supply is increased, thus making it possible to suppress the torque of the internal combustion engine 1 from being decreased. With this, in the period of time from TA to TB, the torque, the output and the rotational speed of the internal combustion engine 1 are maintained substantially constant.

At a point in time indicated by TB in FIG. 4, the wall temperature T3W becomes larger than the lower limit wall temperature T3WT, so the intake passage warming-up flag is changed from on to off. With this, the waste gate valve 44 is opened so that the degree of opening of the throttle valve 7 is adjusted to a degree of opening corresponding to the operating state of the internal combustion engine 1. The waste gate valve 44 is controlled in such a manner that the compressor discharge pressure P3 becomes a required pressure. In this way, the back pressure is decreased so that the efficiency of fuel consumption is improved.

As described above, in this embodiment, in cases where there is a fear that condensed water may be generated in the intake passage 2, the wall temperature of the intake passage 2 can be raised by making the degree of opening of the waste gate valve 44 smaller. With this, it is possible to suppress the generation of condensed water. In addition, at this time, the degree of opening of the throttle valve 7 is adjusted so that the torque of the internal combustion engine 1 does not increase, as a result of which it is possible to suppress the output of the internal combustion engine 1 from being increased.

Second Embodiment

In this second embodiment, when there is a fear that condensed water may be generated in the intake passage 2, the degree of opening of the waste gate valve 44 is made smaller than when there is no fear that condensed water may be generated, and the rotational speed of the turbine 42 is raised by retarding the ignition timing of the spark plugs 8. Then, the degree of opening of the throttle valve 7 is adjusted so that the torque of the internal combustion engine 1 is not changed. The other components and so on in this second embodiment are the same as those in FIG. 1, so the explanation thereof is omitted. As explained in the above-mentioned first embodiment, the wall temperature of the intake passage 2 can be raised by making the turbine inlet temperature T4 higher. Here, in the case of the gasoline engine, by retarding the ignition timing, the energy converted into the torque of the internal combustion engine 1 decreases, and the temperature of the exhaust gas becomes higher. That is, the exhaust gas of high temperature can be made to flow into the turbine 42, so that the rotational speed of the turbine 42 can be made higher. Accordingly, the temperature and pressure of the intake air discharged from the compressor 41 can be raised quickly. In addition, because the temperature and pressure of the intake air discharged from the compressor 41 can be raised more, the wall temperature of the intake passage 2 can be made higher, so that the generation of condensed water can be suppressed in a more reliable manner.

FIG. 5 is a flow chart showing a flow or routine for suppressing the generation of condensed water according to this second embodiment. The routine in this flow chart is carried out by means of the ECU 10 at each predetermined time interval. For those steps in which the same processing as in the aforementioned flow charts are carried out, the same symbols are attached and the explanation thereof is omitted. Here, note that the flow chart shown in FIG. 2 is separately carried out by the ECU 10. The flow chart shown in FIG. 5 may be carried out in succession after the flow chart shown in FIG. 2 ends. In the flow chart or routine shown in FIG. 5, when the processing of step S111 ends, the routine goes to step S201. In step S201, as part of the intake passage warming-up control, the ignition timing is retarded more than at the time of the normal control (i.e., in the case where the wall temperature T3W of the intake passage 2 is higher than the lower limit wall temperature T3WT). An optimum value for an amount of retardation of the ignition timing at this time and an optimum value for the ignition timing at the time of the normal control (i.e., the ignition timing before the start of the intake passage warming-up control, or the ignition timing when the intake passage warming-up control is not carried out) have been obtained in advance by experiments, simulations, or the like, and stored in the ECU 10. When the processing of step S201 ends, the routine goes to step S112. Here, note that in this second embodiment, the ECU 10 functions as a controller in the present disclosure, by carrying out the flow chart shown in FIG. 5.

FIG. 6 is a time chart showing the changes over time of a variety of kinds of values in cases where the intake passage warming-up control according to this second embodiment is carried out. At a point in time indicated by TA, the wall temperature T3W becomes equal to or less than the lower limit wall temperature T3WT, so the intake passage warming-up flag is changed from off to on. With this, the waste gate valve 44 is fully closed. Further, by retarding the ignition timing, the temperature of the exhaust gas can be caused to go up. In that case, the rotational speed of the compressor 41 goes up, so that the compressor discharge pressure P3 increases. In order to suppress the amount of intake air GA from increasing excessively due to this increase in the compressor discharge pressure P3, the throttle valve 7 is controlled to the closed side. Here, note that the back pressure increases due to the rise in the compressor discharge pressure P3, and hence, if the amount of intake air GA is kept from changing after the intake passage warming-up flag is changed from off to on, there is a fear that the torque of the internal combustion engine 1 may decrease. For this reason, the amount of intake air GA is made to increase more than before TA, i.e., than in the case where the wall temperature T3W of the intake passage 2 is higher than the lower limit wall temperature T3WT, so that the torque does not decrease in a period of time from TA to TB. By increasing this amount of intake air GA, the amount of fuel supply is increased, thus making it possible to suppress the torque of the internal combustion engine 1 from being decreased. With this, in the period of time from TA to TB, the torque, the output and the rotational speed of the internal combustion engine 1 are maintained substantially constant.

As described above, in this second embodiment, in cases where there is a fear that condensed water may be generated in the intake passage 2, the wall temperature of the intake passage 2 and the pressure in the intake passage 2 are raised by making the degree of opening of the waste gate valve 44 smaller. With this, it is possible to suppress the generation of condensed water. Moreover, by retarding the ignition timing, too, the rotational speed of the compressor 41 can be increased, and this can enhance the temperature of intake air, so that the wall temperature of the intake passage 2 can be raised further. Accordingly, it is possible to suppress the generation of condensed water in a more reliable manner. In addition, at this time, the degree of opening of the throttle valve 7 is adjusted so that the torque of the internal combustion engine 1 does not increase, as a result of which it is possible to suppress the output of the internal combustion engine 1 from being increased.

Third Embodiment

FIG. 7 is a view showing the schematic construction of intake and exhaust systems of an internal combustion engine 1 according to this third embodiment. A transmission 17 is connected to the internal combustion engine 1 shown in FIG. 7. The other components and so on in this third embodiment are the same as those in FIG. 1, so the explanation thereof is omitted.

The transmission 17 is one of the type, such as a so-called automatic transmission (AT) or a continuously variable transmission (CVT), in which the gear ratio is changed without being based on the intention of a driver. The transmission 17 is connected to the ECU 10 through electrical wiring, so that the gear ratio is controlled by the ECU 10.

As explained in the above-mentioned first embodiment, the wall temperature of the intake passage 2 can be raised by increasing the amount of intake air GA. This amount of intake air GA can be increased by raising the engine rotation speed. Then, in the case where the transmission 17 as in this third embodiment is provided, the gear ratio is made larger thereby to raise or increase the engine rotation speed. In addition, in this embodiment, the engine torque is decreased by making smaller the degree of opening of the throttle valve 7. With this, a variation in the output of the internal combustion engine 1 can be suppressed, while increasing the amount of intake air GA. That is, the engine rotation speed can be raised, while suppressing the vehicle speed from being changed. In this manner, the wall temperature of the intake passage 2 can be further enhanced by increasing the amount of intake air GA. In this case, the degree of opening of the throttle valve 7 is adjusted so that the amount of change in the output of the internal combustion engine 1 falls within the predetermined range, i.e., the vehicle speed becomes substantially constant. In addition, at this time, the degree of opening of the waste gate valve 44 is made smaller, similar to the above-mentioned embodiments.

FIG. 8 is a flow chart showing a flow or routine for suppressing the generation of condensed water according to this third embodiment. The routine in this flow chart is carried out by means of the ECU 10 at each predetermined time interval. For those steps in which the same processing as in the aforementioned flow charts are carried out, the same symbols are attached and the explanation thereof is omitted. Here, note that the flow chart shown in FIG. 2 is separately carried out by the ECU 10. The flow chart shown in FIG. 8 may be carried out in succession after the flow chart shown in FIG. 2 is terminated. In the flow chart or routine shown in FIG. 8, when the processing of step S111 ends, the routine goes to step S301. In step S301, as part of the intake passage warming-up control, the gear ratio is made larger than at the time of the normal control (i.e., in the case where the wall temperature T3W of the intake passage 2 is higher than the lower limit wall temperature T3WT). At this time, the ignition timing may be retarded, as in the above-mentioned second embodiment. An optimum value for the gear ratio to be set at this time and an optimum value for the gear ratio at the time of the normal control (i.e., the gear ratio before the start of the intake passage warming-up control, or the gear ratio when the intake passage warming-up control is not carried out) have been obtained in advance by experiments, simulations, or the like, and stored in the ECU 10. When the processing of step S301 ends, the routine goes to step S112. Here, note that in this third embodiment, the ECU 10 functions as a controller in the present disclosure, by carrying out the flow chart shown in FIG. 8.

FIG. 9 is a time chart showing the changes over time of a variety of kinds of values in cases where the intake passage warming-up control according to this third embodiment is carried out. At a point in time indicated by TA, the wall temperature T3W becomes equal to or less than the lower limit wall temperature T3WT, so the intake passage warming-up flag is changed from off to on. With this, the waste gate valve 44 is fully closed, and the gear ratio is made higher. As a result, the flow rate of the exhaust gas increases, whereby the rotational speed of the turbine 42 goes up, and this causes the rotational speed of the compressor 41 to go up, so that the compressor discharge pressure P3 increases. Further, by making the gear ratio of the transmission higher from a point in time TA, the engine rotation speed goes up. At this time, the torque of the internal combustion engine 1 (i.e., the degree of opening of the throttle valve 7) is adjusted so that the amount of change in the output of the internal combustion engine 1 falls within the predetermined range. Then, due to the rise in the engine rotation speed, the amount of intake air GA increases more than in the case of the above-mentioned first embodiment or second embodiment. Accordingly, a larger amount of intake air at high temperature can be made to discharge from the compressor 41, so the wall temperature of the intake passage 2 can be raised quickly.

As described above, in this third embodiment, in cases where there is a fear that condensed water may be generated in the intake passage 2, the wall temperature of the intake passage 2 and the pressure in the intake passage 2 are raised by making the degree of opening of the waste gate valve 44 smaller. With this, it is possible to suppress the generation of condensed water. Moreover, by raising the gear ratio, too, the amount of intake air GA can be made to increase, so that the wall temperature of the intake passage 2 rises, thus making it possible to suppress condensed water from being generated. In addition, at this time, the degree of opening of the throttle valve 7 is adjusted so that the output of the internal combustion engine 1 does not change, as a result of which it is possible to suppress the vehicle speed from being changed. Further, even in cases where the vehicle speed is low, the engine rotation speed can be made higher by raising the gear ratio in the transmission 17, so that the wall temperature of the intake passage 2 can be raised, from a vehicle speed which is lower than in the case of the first embodiment.

Fourth Embodiment

FIG. 10 is a view showing the schematic construction of intake and exhaust systems of an internal combustion engine 100 according to this fourth embodiment. In the above-mentioned second embodiment, the gasoline engine provided with the spark plugs 8 has been explained, but in this fourth embodiment, there will be explained a diesel engine in which a fuel injection valve 18 for injecting fuel into a cylinder is provided for each cylinder.

In addition, a turbocharger 4 according to this fourth embodiment is a variable capacity type turbocharger in which a turbine 42 is provided with a nozzle vane 45, wherein the flow speed of exhaust gas passing through the turbine 42 is made variable by opening and closing of the nozzle vane 45. Moreover, in this fourth embodiment, the bypass passage 43 and the waste gate valve 44 in FIGS. 1 and 7 are not provided. The nozzle vane 45 is controlled by the ECU 10.

With the turbocharger 4 constructed in this manner, by making the degree of opening of the nozzle vane 45 smaller, the flow speed of exhaust gas passing through the turbine 42 is increased, thereby raising the rotational speed of the turbine 42. As a result of this, the rotational speed of the compressor 41 goes up, so that the compressor discharge pressure increases. Accordingly, by making the degree of opening of the nozzle vane 45 smaller, the wall temperature of the intake passage 2 can be raised, as in the case of making the degree of opening of the waste gate valve 44 smaller. An optimum value for the degree of opening of the nozzle vane 45 at this time and an optimum value for the degree of opening of the nozzle vane 45 at the time of the normal control (i.e., the degree of opening of the nozzle vane 45 before the start of the intake passage warming-up control, or the degree of opening of the nozzle vane 45 when the intake passage warming-up control is not carried out) have been obtained in advance by experiments, simulations, or the like, and stored in the ECU 10. Here, note that, with the diesel engine, the torque to be produced can be adjusted by an amount of fuel injection from each fuel injection valve 18, so it is not necessary to throttle the amount of intake air in the internal combustion engine 100 by means of the throttle valve 7. That is, the torque of the internal combustion engine 100 is adjusted by adjusting the amount of fuel injection from each fuel injection valve 18, instead of adjusting the degree of opening of the throttle valve 7 thereby to adjust the torque of the internal combustion engine 100, as in the above-mentioned embodiments. Here, by making smaller the degree of opening of the nozzle vane 45, the rotational speed of the turbine 42 and the compressor 41 goes up, so that the pressure of intake air is increased, thus increasing the back pressure. For this reason, if the amount of fuel injection is not increased, the torque of the internal combustion engine 100 will be caused to decrease, and hence, when the degree of opening of the nozzle vane 45 is made smaller, the amount of fuel injection is increased more than when it is not made smaller.

Moreover, as explained in the above-mentioned second embodiment, with the gasoline engine, the wall temperature of the intake passage 2 can be caused to go up, by retarding the ignition timing, but with the diesel engine, the temperature of the exhaust gas can be caused to go up, by retarding the fuel injection timing. That is, by retarding the fuel injection timing, the energy converted into the torque of the internal combustion engine 100 decreases, and the temperature of the exhaust gas becomes higher. As a result of this, the exhaust gas of high temperature can be made to flow into the turbine 42, so that the rotational speed of the turbine 42 can be made higher. Accordingly, the temperature and pressure of the intake air discharged from the compressor 41 can be raised quickly. In addition, because the temperature and pressure of the intake air discharged from the compressor 41 can be raised, the wall temperature of the intake passage 2 can be made high, so that the generation of condensed water can be suppressed in a more reliable manner. An optimum value for an amount of retardation of the fuel injection timing at this time and an optimum value for the fuel injection timing at the time of the normal control (i.e., the fuel injection timing before the start of the intake passage warming-up control, or the fuel injection timing when the intake passage warming-up control is not carried out) have been obtained in advance by experiments, simulations, or the like, and stored in the ECU 10.

FIG. 11 is a flow chart showing a flow or routine for suppressing the generation of condensed water according to this fourth embodiment. The routine in this flow chart is carried out by means of the ECU 10 at each predetermined time interval. For those steps in which the same processing as in the aforementioned flow charts are carried out, the same symbols are attached and the explanation thereof is omitted. Here, note that the flow chart shown in FIG. 2 is separately carried out by the ECU 10. The flow chart shown in FIG. 11 may be carried out in succession after the flow chart shown in FIG. 2 ends. In the flow chart shown in FIG. 11, in cases where an affirmative determination is made in step S110, the routine goes to step S401. In step S401, as part of the intake passage warming-up control, the degree of opening of the nozzle vane 45 is made smaller than at the time of the normal control (i.e., in the case where the wall temperature T3W of the intake passage 2 is higher than the lower limit wall temperature T3WT). Here, note that in combination with this time, the fuel injection timing may be retarded, or the gear ratio may be increased, as explained in the third embodiment. An optimum value for the gear ratio to be set at this time and an optimum value for the gear ratio at the time of the normal control (i.e., the gear ratio before the start of the intake passage warming-up control, or the gear ratio when the intake passage warming-up control is not carried out) have been obtained in advance by experiments, simulations, or the like, and stored in the ECU 10. After the processing of step S401 ends, the routine goes to step S402, where the amount of fuel injection is adjusted so that an amount of change in the output of the internal combustion engine 100 falls within the predetermined range. Here, note that in this fourth embodiment, the ECU 10 functions as a controller in the present disclosure, by carrying out the flow chart shown in FIG. 11.

As described above, according to this fourth embodiment, even in the case of the diesel engine, it is possible to suppress condensed water from being generated in the intake passage 2. Here, note that in the case of the diesel engine, too, the amount of the exhaust gas passing through the turbine 42 can be changed by means of the waste gate valve 44, instead of the nozzle vane 45, and hence, in the case where the waste gate valve 44 is provided, instead of the nozzle vane 45, when there is a fear that condensed water may be generated, the degree of opening of the waste gate valve 44 need only be made smaller, similar to the above-mentioned embodiments. Moreover, both of the waste gate valve 44 and the nozzle vane 45 can also be provided, and so, in the case of providing with both the waste gate valve 44 and the nozzle vane 45, when there is a fear that condensed water may be generated, the degree of opening of either one or each of these valves may be made smaller. In these cases, in step S401 of FIG. 11, the degree of opening of the waste gate valve 44 is made smaller, instead of the nozzle vane 45, or the degree of opening of each of the waste gate valve 44 and the nozzle vane 45 is made smaller. In addition, in these cases, in step S402 of FIG. 11, the amount of fuel injection need only be adjusted so that the amount of change in the output of the internal combustion engine 100 falls within the predetermined range. At this time, the back pressure increases as mentioned above, so the decrease in the engine torque is suppressed by increasing the amount of fuel injection. At this time, further, the fuel injection timing may also be retarded, or the gear ratio may also be made larger.

The invention claimed is:

1. A control system for an internal combustion engine, which controls the internal combustion engine including:

a turbocharger including a compressor in an intake passage of the internal combustion engine and a turbine in an exhaust passage of the internal combustion engine; and an EGR passage connecting between said intake passage at an upstream side of said compressor and said exhaust passage at a downstream side of said turbine;

said control system comprising:

a temperature detector configured to estimate or detect a temperature of a wall surface of said intake passage at a downstream side of said compressor; and a controller programmed to make a rotational speed of said turbine higher in the case where the temperature of the wall surface of said intake passage estimated or detected by said temperature detector is equal to or less than a predetermined temperature which is equal to or higher than a dew point temperature of intake air flowing through said intake passage at a downstream side of said compressor, than in the case where the estimated or detected temperature of the wall surface of said intake passage is higher than said predetermined temperature, said controller programmed to adjust torque of said internal combustion engine such that an amount of change in an output of said internal combustion engine at the time of the rotational speed of said turbine being thus made higher falls within a predetermined range.

2. The control system for an internal combustion engine as set forth in claim 1, wherein said internal combustion engine is provided with a throttle valve in said intake passage at the downstream side of said compressor;

said turbocharger is provided with a bypass passage configured to bypass said turbine, and a waste gate valve that is arranged in said bypass passage and configured to adjust a flow rate of exhaust gas flowing through said bypass passage;

said temperature detector configured to estimate or detect the temperature of the wall surface of said intake passage at the downstream side of said compressor and at the upstream side of said throttle valve; and said controller programmed to decide an amount of fuel supply to said internal combustion engine according to an amount of intake air in said internal combustion engine, and make the rotational speed of said turbine higher by making a degree of opening of said waste gate valve smaller, and adjust the torque of said internal combustion engine by making a degree of opening of said throttle valve smaller, in the case where the temperature of the wall surface of said intake passage estimated or detected by said temperature detector is equal to or less than said predetermined temperature, than in the case where it is higher than said predetermined temperature.

3. The control system for an internal combustion engine as set forth in claim 2, wherein said internal combustion engine is provided with a spark plug configured to fire a mixture in a combustion chamber by producing an electric spark in the combustion chamber; and said controller programmed to make the rotational speed of said turbine higher by making the degree of opening of the waste gate valve smaller and by retarding ignition timing of said spark plug more, in the case where the temperature of the wall surface of said intake passage estimated or detected by said temperature detector is equal to or less than said predetermined temperature, than in the case where it is higher than said predetermined temperature.

4. The control system for an internal combustion engine as set forth in claim 1, wherein said internal combustion engine is an internal combustion engine which performs compression self-ignition, and is provided with a fuel injection valve configured to inject fuel into a cylinder of said internal combustion engine;

said turbocharger is provided with a bypass passage configured to bypass said turbine, and a waste gate valve that is arranged in said bypass passage and configured to adjust the flow rate of exhaust gas flowing through said bypass passage; and said controller programmed to adjust the torque of said internal combustion engine by adjusting an amount of fuel injected from said fuel injection valve, and further, make the rotational speed of said turbine higher by making a degree of opening of said waste gate valve smaller, in the case where the temperature of the wall surface of said intake passage estimated or detected by said temperature detector is equal to or less than said predetermined temperature, than in the case where it is higher than said predetermined temperature.

5. The control system for an internal combustion engine as set forth in claim 4, wherein said controller programmed to make the rotational speed of said turbine higher by retarding the fuel injection timing of said fuel injection valve more, in the case where the temperature of the wall surface of said intake passage estimated or detected by said temperature detector is equal to or less than said predetermined temperature, than in the case where it is higher than said predetermined temperature.

6. The control system for an internal combustion engine as set forth in claim 1, wherein said internal combustion engine is an internal combustion engine which performs compression self-ignition, and is provided with a fuel injection valve configured to inject fuel into a cylinder of said internal combustion engine;

said turbocharger is provided with a nozzle vane configured to adjust a flow speed of exhaust gas passing through said turbine; and said controller programmed to adjust the torque of said internal combustion engine by adjusting an amount of fuel injected from said fuel injection valve, and further, make the rotational speed of said turbine higher by making a degree of opening of the nozzle vane smaller, in the case where the temperature of the wall surface of said intake passage estimated or detected by said temperature detector is equal to or less than said predetermined temperature, than in the case where it is higher than said predetermined temperature.

7. The control system for an internal combustion engine as set forth in claim 6, wherein said turbocharger is further provided with a bypass passage configured to bypass said turbine, and a waste gate valve that is arranged in said bypass passage and configured to adjust a flow rate of exhaust gas flowing through said bypass passage; and said controller programmed to make the rotational speed of said turbine higher by making the degree of opening of said nozzle vane smaller and by making a degree of opening of said waste gate valve smaller, in the case where the temperature of the wall surface of said intake passage estimated or detected by said temperature detector is equal to or less than said predetermined temperature, than in the case where it is higher than said predetermined temperature.

8. The control system for an internal combustion engine as set forth in claim 1, wherein provision is further made for a transmission which is connected to an output shaft of said internal combustion engine, and a gear ratio of which is controlled by said controller;

said controller programmed to make the rotational speed of said turbine higher by making a gear ratio of said transmission higher, in the case where the temperature of the wall surface of said intake passage estimated or detected by said temperature detector is equal to or less than said predetermined temperature, than in the case where it is higher than said predetermined temperature.

\* \* \* \* \*